United States Patent

Calkins

[11] Patent Number: 5,114,286
[45] Date of Patent: May 19, 1992

[54] INTERCHANGEABLE TOOL ALIGNMENT SYSTEM

[76] Inventor: Donald W. Calkins, 35 Edgemont Rd., Devon, Conn. 06460

[21] Appl. No.: 744,345

[22] Filed: Aug. 13, 1991

[51] Int. Cl.⁵ .............................................. B23B 51/02
[52] U.S. Cl. ................................... 408/226; 408/233
[58] Field of Search ............... 408/226, 227, 229, 231, 408/233

[56] References Cited

U.S. PATENT DOCUMENTS

| Re. 26,452 | 9/1968 | Dearborn . |
| 534,009 | 2/1895 | Pratt . |
| 2,237,901 | 4/1941 | Chun .................... 408/233 |
| 2,346,546 | 4/1944 | Anderson . |
| 2,418,021 | 3/1947 | Fleischer . |
| 2,739,496 | 3/1956 | Fleischer . |
| 3,153,356 | 10/1964 | Dearborn . |
| 3,304,816 | 2/1967 | Galorneau . |
| 3,320,833 | 5/1967 | Andreasson . |
| 4,437,802 | 3/1984 | Hall . |
| 4,804,300 | 2/1989 | Tsui et al. . |

Primary Examiner—Daniel W. Howell

[57] ABSTRACT

An interchangeable cutting tool alignment and positioning system comprising, at least, a first tool segment and a second tool segment, said first tool segment comprising a male coupler means axially aligned with and concentric with an axis of rotation of said first tool segment, said second tool segment comprising a female coupler means aligned with and concentric with an axis of rotation of said second tool segment, said male coupler means which extends from an end of said first tool segment.

24 Claims, 5 Drawing Sheets

INTERCHANGEABLE TOOL ALIGNMENT SYSTEM

FIELD OF THE INVENTION

The present invention relates generally to cutting tools as are used to develop accurate, close-tolerance, precision holes in work pieces, and more specifically to the mounting mechanisms for interchangeable precision hole cutting and boring tool segments, e.g., segmented gun drills, in a single mounting holder.

BACKGROUND OF THE INVENTION

One of several systems used to produce accurate, close-tolerance, precision holes, whether deep or relatively shallow, in metals, as well as other materials, is by use of a cutting tool known as a gun drill. Originally, gun drills were used to drill quite long holes through solid stock to be used as gun barrels. The dimensional tolerances and degree of straightness required for such holes were quite exacting, and with the advent of mass production, precision was required, i.e., the hole through each gun barrel was required, within very close tolerances, to be identical to all other holes in the lot of gun barrels being produced. The cutting tools originally developed to bore such holes in gun barrels have found much broader use, at present, and are used in a wide variety of situations where accurate, straight precision holes are required to be cut or bored.

Gun drills of various designs and modification are well known to those skilled in the art. Examples of various gun drill designs are described and illustrated in U.S. Pat. Nos. 534,009; 2,346,546; 2,418,021; 2,739,496; 3,153,356; 3,304,816; 3,320,833; 4,437,802; 4,804,300 and Re. 26,452. As Will be well understood by those skilled in the art, from a review of such U.S. Patents, gun drills are not inexpensive devices, as they require great skill and care in their production. Yet, gun drills are normally produced to a given set size, for boring a single diameter of hole with a specified set depth. To bore a hole of a different diameter and/or of a significantly different depth, another gun drill designed for that different hole must be used. Thus, those who practice gun drilling usually must stock a rather extensive variety of differing diametrical and depth-size gun drills, with a commensurate substantial amount of funding being invested in that stock.

Various attempts have been made to reduce the cost of gun drills in respect to maintaining the capability to bore a reasonably broad array of differing diametrical sizes of holes and/or a reasonably broad array of bore depths for each diametrical size of hole. For example, U.S. Pat. No. 3,304,816 discloses a multi-section tool, separable from its driving means, which uses a mating undercut arrangement in the form of a helix, on the corresponding male and female ends of the sections, to coaxially join the sections together, thus rendering the cutting tip detachable from the tool holder and providing means to vary bore hole diameters as well as a system for interpositioning of additional coaxial extensions to provide adjustable bore depth capability. Another example is shown in U.S. Pat. Nos. 3,153,356 and Re. 26,452 which disclose a gun drill arrangement in which the tool may be extended by threading sections coaxially together; the threads are helical in form with a specified helix angle range for locking the male and female threads to each other as the means for coaxially aligning the tool sections. Another example is disclosed in U.S. Pat. No. 2,346,546 which shows an arrangement for extending the length of the tool by slip fitting a formed male section into a correspondingly sized and shaped female section. Another example is provided in U.S. Pat. No. 534,009 which discloses a conceptually similar arrangement to that shown in U.S. Pat. No. 2,346,546, but with the corresponding male and female slip-fit sections being formed into interlocking axially aligned key and keyway sections. Another example is illustrated in U.S. Pat. No. 2,418,021 which shows and arrangement for extending the length of a gun drill, and for interchanging the cutting tip end, by means of a male pilot extension being slip fitted into a correspondingly sized axial bore in another section. Yet another example is illustrated in U.S. Pat. No. 3,320,833 which discloses means for interchanging gun drill cutting tips, and for extending the length of a gun drill, by axially bolting the corresponding pieces together. Even yet another example is provided by U.S. Pat. No. 2,739,496 which discloses a similar bolt arrangement, to that shown in U.S. Pat. No. 3,320,833, but with axially aligned corresponding and mating male-female conical surfaces. A final example is provided by U.S. Pat. No. 4,437,802 which discloses and arrangement of interchangeable, differing-sized cutting blades for gun drills.

It has been found that there is a critical requirement which must be met to provide the capability in a gun drill to bore close dimensional size tolerance holes, especially those that are relatively deep in relation to the diametrical sizing of the hole, while still maintaining exact straightness of those holes, as well as alignment of the holes exactly perpendicular to the axis of rotation of the tool, while providing precision, i.e., the ability to repeatedly bore exactly the same diametrical size of hole, time after time, all within a very close size tolerance, while keeping the respective holes all exactly straight, all exactly aligned parallel to each other and all exactly perpendicular to the axis of rotation of the tool. Simply stated, the requirement is that the overall axis of the tool must be the exact rotational axis of all contact surfaces of the tool, i.e., all surfaces of the tool, which come into direct contact with the work piece, must be exactly symmetrical with the overall axis of rotation of the tool. Of course, when the tool is a single piece, being machined all on the exact same centers, e.g., by way of a lathe and with finishing being accomplished on a cylindrical grinder and a tool grinder, the required axial alignment is not a significant problem. But when the tool is multi-pieced, e.g., where the cutting tips are replaceable and/or the tool is extendable by the addition of pieces or tool segments interposed along the rotational axis, problems in exact axis-of-rotation alignment, i.e., true symmetry of the multiple pieces one to the other, becomes a problem. Several of the foregoing published references mention and discuss this problem, but none seem to clearly and definitively disclose means to ensure a cure, or even to significantly diminish the problem.

The axial misalignment problem, outlined above, seems to be most acute in systems which seek to add axial extensions, either to change the diametrical sizing of the gun drill or to extend its length. Even though the components of the tool may initially be assembled in exact axial alignment with each other, it is extremely difficult to maintain that axial alignment during use of the tool. For example, the initial contact of the tool with the work piece causes a misaligned, asymmetrical and skewed vector of force on a point of the tool which is not on the axis of rotation. This vector of force tends to flex the tool even though the cutting tip may be held in position by a guide bushing, a common practice in gun drilling. The flexing results in some degree of bending and twisting along the linear section of the tool. Unless prevented, this bending and twisting will cause the adjoined tool sections to move in relation to each other, causing a misalignment of those sections and resulting in a disturbance of the symmetry of the work piece contact surfaces and the formation of a new and asymmetrical axis of rotation. Even a misalignment of symmetry, at a joint of the tool sections, of 0.0001–0.0002" may be compounded to a misalignment of 0.002–0.004" or more at the cutting tip, resulting in a bored hole which is oversized beyond the permitted tolerance range. Such a misalignment at the cutting tip, consequently, places a continuously greater relative stress on one side of the tool than the other, tending to cause the tool to wander from the intended straight path, resulting in a bore which is not exactly axially aligned with the axis of rotation of the tool; thus the work piece would have a misaligned hole not perpendicular to the original axis of rotation of the tool and not exactly straight over its length if the hole had any significant depth.

Flexing of the tool, resulting in relative movement of the adjoined sections at the joint therebetween, may also be caused by, for example, hard spots in the work piece, work-hardening of the work piece from heat build up, dulling of the edges of the cutting tip at an uneven rate, an uneven or disproportionate heat up rate of the different sections of the tool or compaction of metal chips at the cutting face and by breaking or chipping of the cutting tip. Whatever the reason for the flexing of the tool, if it is permitted to result in movement of the tool sections relative to each other, the accuracy and precision of the gun drilling operation is lost, tolerances must be increased, and the cost of producing exactly axially aligned, exactly straight and exact diametrically sized bores, on a repeatable basis, are substantially increased due to the need to use secondary finishing operations.

None of the above cited published references appear to provide adequate means to ensure that there is no movement of adjoining tool sections, relative to each other, and thus potential misalignment of the respective axes of rotation is a significant risk. Further, none of the above cited published references appear to provide means by which adjoining tool sections can be exactly axially aligned on a single true axis of rotation, upon assembly, without first removing the tool holder from the machine tool, then tediously assembling the tool section with the tool holder on centers, by use of sensitive dial indicators, then re-mounting the assembly to the machine tool (the latter step which may, in some cases, cause misalignment of the tool holder with the axis of rotation of the machine tool spindle).

BRIEF DESCRIPTION OF THE INVENTION

The present invention comprises an interchangeable cutting tool alignment and positioning system comprising, at least, a first tool segment and a second tool segment, with the first tool segment comprising a male coupler means axially aligned with and concentric with an axis of rotation of the first tool segment, and the second tool segment comprising a female coupler means aligned with and concentric with an axis of rotation of the second tool segment. The male coupler means extends from and end of the first tool segment and comprises:

a.) pilot means, extending from one end of the male coupler means as an integral part thereof. The pilot means provides a first cylindrical mating surface for assembly of the first and second tool segments in coaxial alignment with each other relative to their respective axes of rotation;

b.) concentric alignment means, separated from and spaced apart from the pilot means, which form an integral part of the male coupler means. The concentric alignment means provide a second cylindrical mating surface, likewise, for assembly of the first and second tool segments in coaxial alignment with each other relative to their respective axes of rotation;

c.) First planar surface means which provide a first mating surface perpendicular to the first tool segment axis of rotation and, also, to the second cylindrical mating surface of the concentric alignment means. The first planar mating surface extends inwardly, from the concentric alignment means toward the first tool segment axis of rotation. The first planar surface means provides a first mating surface for assembly of the first and second tool segments in coaxial alignment with each other relative to their respective axes of rotation;

d.) second planar surface means which provide a second planar mating surface extending outwardly from the concentric alignment means, away from the first tool segment axis of rotation, at the opposite end thereof from the first planar surface means. The second planar mating surface is perpendicular to the first tool segment axis of rotation and, also, to the second cylindrical mating surface of the concentric alignment means. The second planar surface means provides a second planar mating surface for assembly of the first and second tool segments in coaxial alignment relative to their respective axes of rotation;

e.) male thread means, extending between and spacing apart the pilot means and the concentric alignment means, which are concentric with the pilot means and the concentric alignment means. The male thread means serve to provide threadable engagement between, and the holding together of, the assembly of the first and second tool segments in coaxial alignment with each other relative to their respective axes of rotation.

The female coupler means are integral with and formed into one end of the second tool segment and comprise:

f.) pilot bore means, extending within one end of the female coupler means, which provide a first complementary cylindrical mating surface, corresponding to the first cylindrical mating surface of the pilot means, for assembly of the first and second tool segments in coaxial alignment with each other relative to their respective axes of rotation;

g.) concentric bore means, separated and spaced apart from the pilot means, which are integral with the female coupler means. The concentric bore means provide a second complementary cylindrical mating surface, corresponding to the second cylindrical mating surface of the concentric alignment means, for assembly of the first and second tool segments in coaxial alignment with each other relative to their respective axes of rotation;

h.) first complementary planar surface means which provide a first complementary planar mating surface which perpendicular to the second tool segment axis of rotation and, also, to the second complementary cylindrical mating surface of the concentric bore means. The first complementary planar mating surface extends inwardly from the concentric bore means toward the second tool segment axis of rotation. The first complementary planar surface means provides a first complementary planar mating surface, corresponding to the first planar mating surface of the concentric alignment means, for assembly of the first and second tool segments in coaxial alignment with each other relative to their respective axes of rotation;

i.) second complementary planar surface means which provides a second planar mating surface extending outwardly from the concentric bore means and away from the second tool segment axis of rotation. The second complementary planar surface means extends at the opposite end of the concentric bore means from the extension of the first complementary planar surface means, and the second complementary planar mating surface is perpendicular to the second tool segment axis of rotation. The second complementary planar surface means provides a second complementary planar mating surface, corresponding to the second planar mating surface of the second planar mating surface means, for assembly of the first and second tool segments in coaxial alignment with each other relative to their respective axes of rotation;

j.) female thread means extending between the pilot bore means and the concentric bore means, separating and spacing apart the pilot bore means and the concentric bore means. The female thread means are concentric with both the pilot bore means and the concentric bore means, and the female thread means are complementary with and correspond to the male thread means. The female thread means provide threadable engagement with the male thread means, and also holding means, for assembly of the first and second tool segments in coaxial alignment with each other relative to their respective axes of rotation.

The male coupler means and the female coupler means provide for threaded coaxial engagement of the first and second tool segments relative to their respective axes of rotation, to concentrically align those first and second tool segments such that a single common rotational axis is provided. Such engagement of the male coupler means and the female coupler means, on assembly of the first and second tool segments, also prevents misalignment of the first and second tool segments from that so defined single common rotational axis.

The present invention preferably further comprises:

a.) third planar surface means which provides an additional planar mating surface at one end of the male coupler means forming a terminus of that end of the male coupler means. The third planar mating surface is perpendicular to the first tool segment axis of rotation and also to the first cylindrical mating surface of the pilot means, with the third planar mating surface extending from the first cylindrical mating surface of the pilot means to the first tool segment axis of rotation. The third planar surface means provides an additional planar mating surface for assembly of the first and second tool segments in coaxial alignment with each other relative to their respective axes of rotation; and b.) third complementary planar mating surface means, at one end of and integral with the female coupler means, forming a terminus of that end of the female coupler means. The third complementary planar mating surface means, likewise, perpendicular to the second tool segment axis of rotation and also the first complementary cylindrical mating surface of the pilot bore means. The third complementary planar mating surface means extends from The complementary cylindrical mating surface of the pilot bore means inwardly to the second tool segment axis of rotation. The third complementary planar surface means provides an additional complementary planar mating surface, corresponding to the additional planar mating surface of the third planar mating surface means, for assembly of the first and second tool segments in axial alignment with each other relative to their respective axes of rotation.

The present invention also preferably comprises the male thread means being a modified square male thread and the female thread means being a complementary and corresponding modified square female thread; modified square threads are defined hereinafter.

These and other features of the present invention will be more fully described in the following detailed description and illustrated in the accompanying drawings

DETAILED DESCRIPTION OF THE INVENTION

Figure 1:
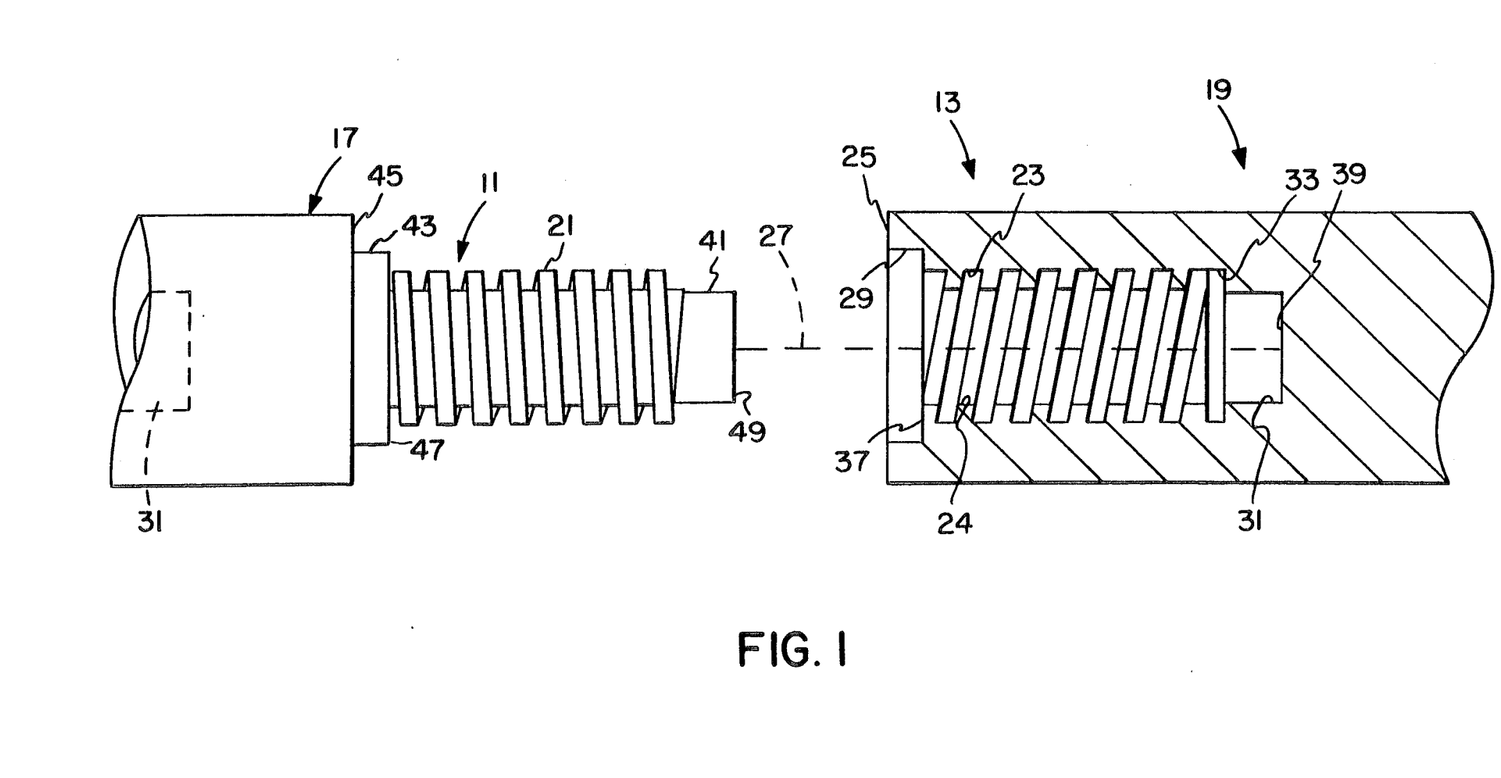
FIG. 1 is a semi-schematic, partially cut-away, exploded side elevational view of the assembly of the present invention.

Referring to FIG. 1 there is shown a male coupler 11 and a female coupler 13 which comprise two major parts of the present invention. Male coupler 11 is fixed to and extends from tool segment 17, being axially aligned and concentric therewith, and female coupler 13 is formed into an end of tool segment 19, female coupler 13 being axially aligned and concentric with tool segment 19. Both male coupler 11 and female coupler 13 are generally cylindrical in shape as are tool segment 17 and tool segment 19, respectively. Formed into the cylindrical surface of male coupler 11 is helical male thread 21 which is sized and shaped to match corresponding helical female thread 23 as formed into a hollow cylindrical surface which comprises cylindrical step bore 24 axially interposed into female coupler 13.

As depicted in FIG. 1, in the exploded view, male coupler 11 and tool segment 17 are axially and concentrically aligned with rotational axis 27. When male coupler 11 is threaded into female coupler 13, to assemble tool segments 17 and 19, the assembly embodies rotational axis 27 about which tool segments 17 and 19 are rotated when the tool, of which tool segments 17 and 19 are part, is placed into operation in a machine tool, e.g., a gun drilling machine.

Female coupler 13 includes flange face 25 which is in the form of a plane and is perpendicular to the rotational axis 27 of female coupler 13 and tool segment 19. Concentric bore 29 is formed into flange face 25, with concentric bore 29 being larger in diameter than step bore 24 as well as being larger in diameter than the root diameter of female thread 23. Thus, on assembly of tool segments 17 and 19, male thread 21 of male coupler 11 may readily be inserted through concentric bore 29 to engage female thread 23 of female coupler 13.

Figure 3:
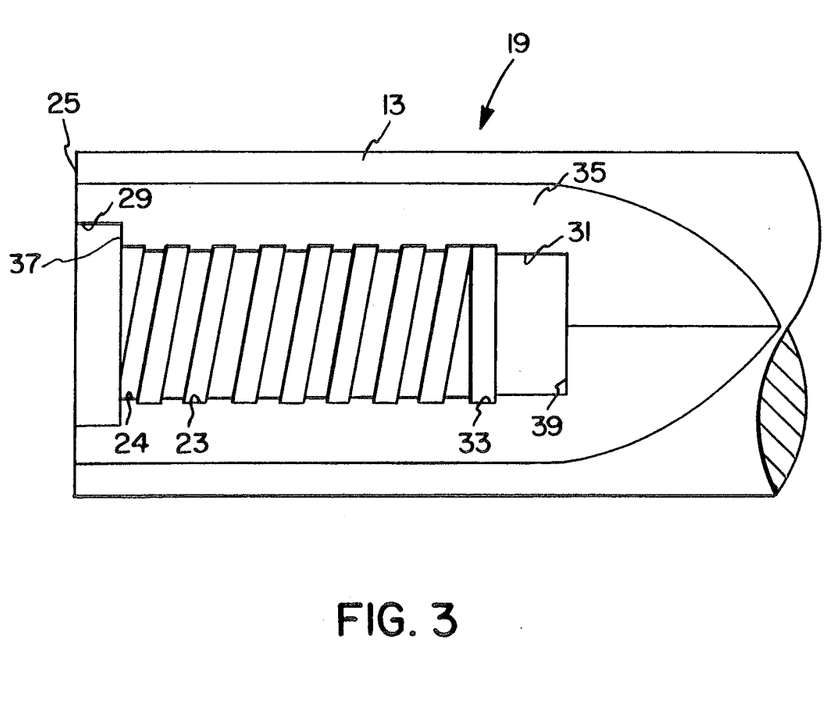
FIG. 3 is a semi-schematic side elevational view of the female coupler of the present invention as viewed in the direction of A—A of FIG. 2.
Figure 6:
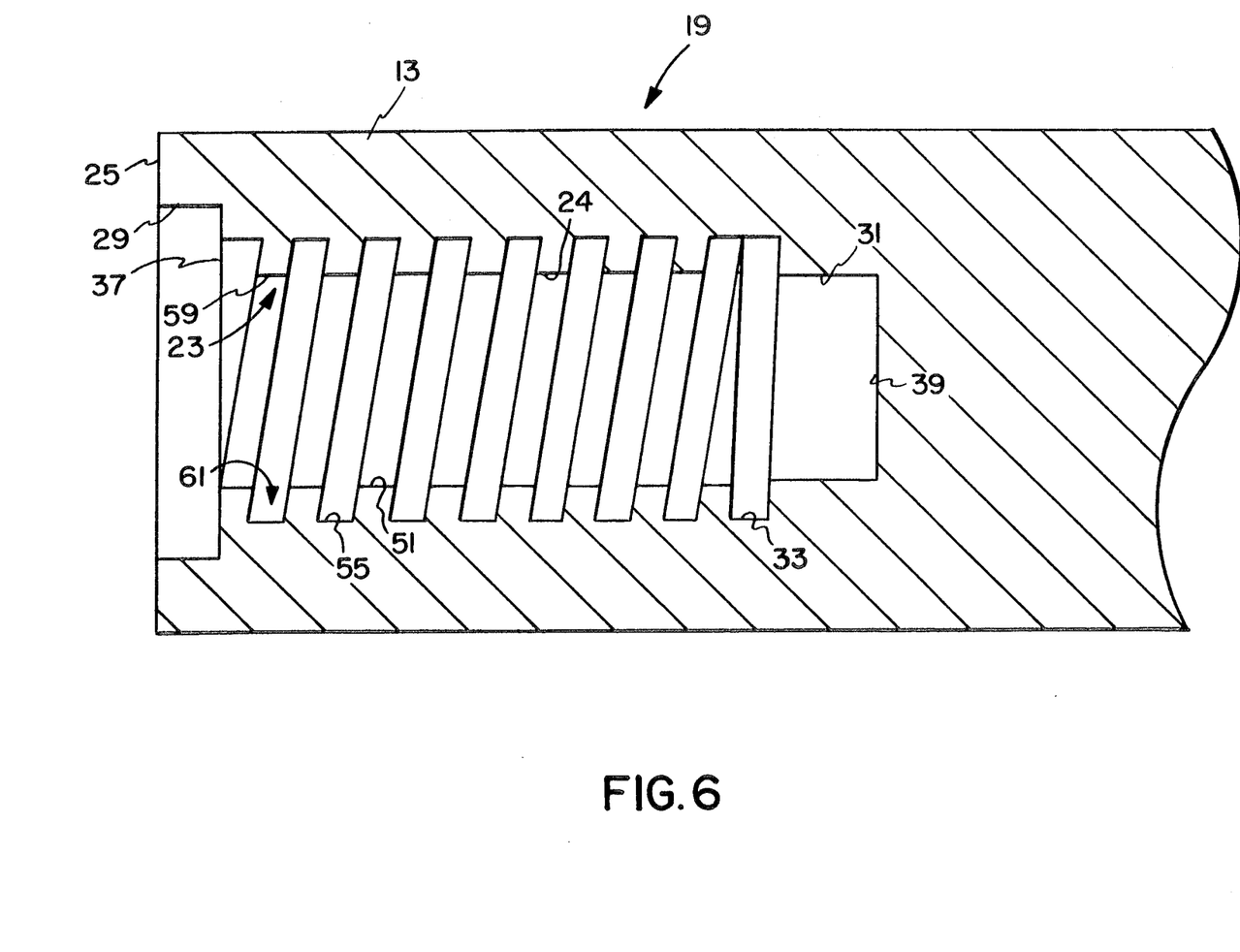
FIG. 6 is a semi-schematic, cut-away side elevational view, enlarged, of the right hand part of FIG. 1 showing the female coupler of the present invention.

At the opposite end of step bore 24, from concentric bore 29, is pilot bore 31 which is smaller in diameter than step bore 24. It is preferable that pilot bore 31 be a blind bore as shown in FIG. 1, FIG. 3 and FIG. 6, the reason for which will be explained hereinafter. As implied, pilot bore 31, step bore 24, female thread 23 and concentric bore 29 are all concentric with each other and with both female coupler 23 and tool segment 19, all of which share rotational axis 27 as their uniform axis of rotation. It is the combination of pilot bore 31, step bore 24, female thread 23 and concentric bore 29 which comprise female coupler 13 which, in turn, forms an extension of tool segment 19. Preferably, at the ends of step bore 24 and female thread 23, adjacent to pilot bore 31, there is thread clearance groove 33 which serves to aid in the formation of female thread 23 in step bore 24 by conventional machining means as will be well understood by those skilled in the art.

Figure 2:
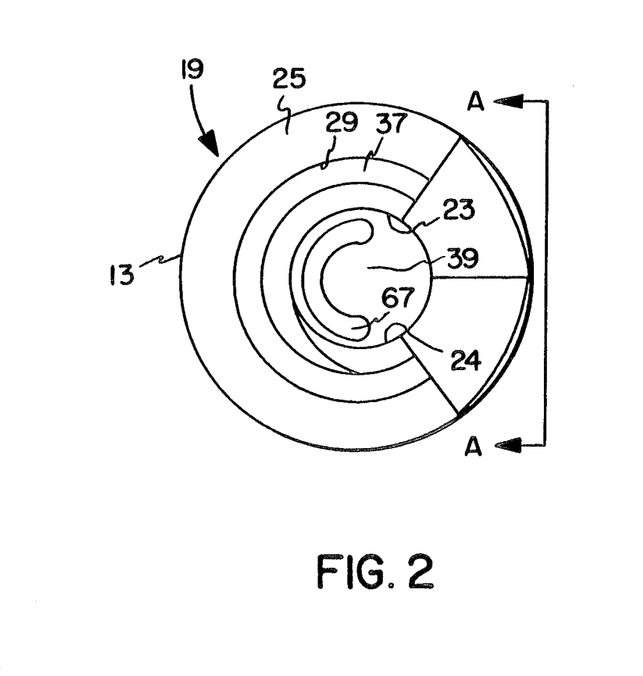
FIG. 2 is a semi-schematic plan view of the female coupler of the present invention.

As will be noted from viewing FIG. 2 and FIG. 3, chip groove 35 is formed into tool segment 19 to extend at least the length of female coupler 13, and which provides a linear cut-away section of female coupler 13. Chip groove 35 is conventional in shape, formation and size, as will be well understood by those skilled in the art, and may be formed by conventional machining means. Chip groove may also extend for the overall length of tool segment 19 or it may terminate just beyond the end of pilot bore 31 as shown in FIG. 2 and FIG. 3.

Referring to FIG. 1, FIG. 2, FIG. 3 and FIG. 6, it will be noted that the juncture between concentric bore 29 and step bore 24 is provided by step shoulder 37 which is in the form of a plane perpendicular to rotational axis 27 and parallel to flange face 25. As mentioned previously, pilot bore 31 is preferably a blind bore, terminating in pilot face 39 which is in the form of a plane perpendicular to rotational axis 27 and parallel to step shoulder 37 and flange face 25.

Figure 4:
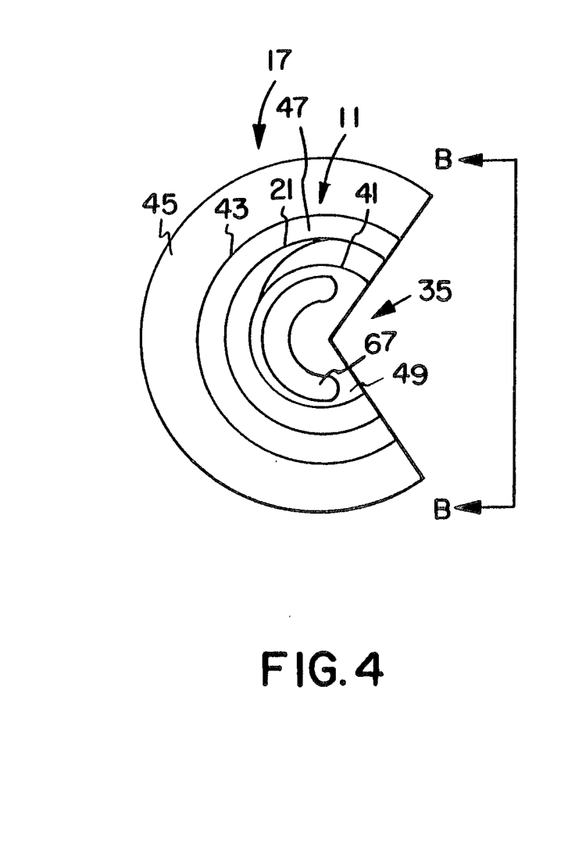
FIG. 4 is a semi-schematic plan view of the male coupler of the present invention.
Figure 5:
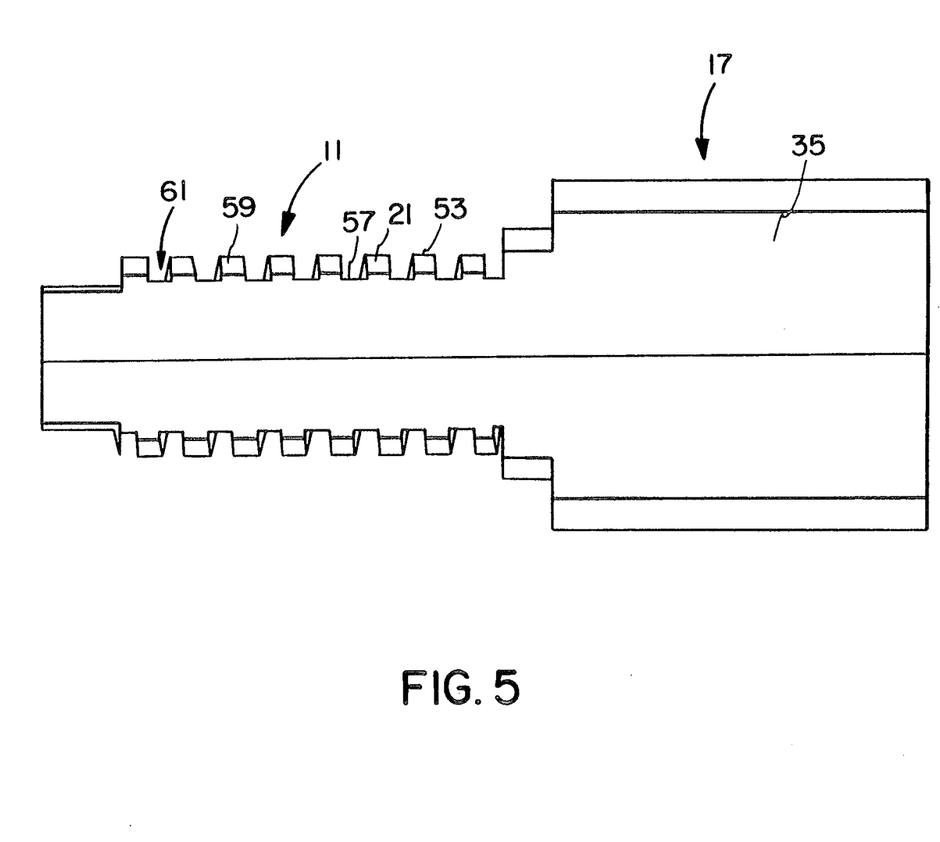
FIG. 5 is a semi-schematic side elevational view of the male coupler of the present invention as viewed in the direction of B—B of FIG. 4.

Referring to FIG. FIG. 4 and FIG. 5, male coupler 15 comprises pilot 41, male thread 21 and a concentric aligner 43. As can best be envisioned from viewing FIG. 1, when male thread 21 is fully engaged with female thread 23, pilot 41 extends to within pilot bore 31 and concentric aligner 43 extends to within concentric bore 29. The juncture between concentric aligner 43 and the balance of tool segment 17 (that portion of tool segment 17 not included in male coupler 11) is provided by buttress flange 45 while the juncture between concentric aligner 43 and male thread 21 is provided by step flange 47; both buttress flange 45 and step flange 47 are in the form of planes perpendicular to rotational axis 27 and parallel to each other.

The dimensional tolerances of concentric aligner 43 and concentric bore 29, relative to each other, are quite important. The diametrical sizing of concentric aligner 43 must match that of concentric bore 29 to a very close tolerance, with the difference preferably being no greater than 0.001". For example, if concentric aligner 43 is diametrically sized at 1.140", the tolerance specified would be +0.0000", −,0.0005" while the corresponding diametrical sizing of concentric bore 29 would likewise be stated as 1.140", but with a specified tolerance of +0.0005", −0.0000". Such close tolerances would normally be formed by grinding operations with a surface finish being specified, for example, as 10-20 RMS. The length of concentric aligner 43 must also match the length of concentric bore 29, likewise, to a very close tolerance with the difference preferably being no greater than 0.001". For example, if concentric aligner 43 is sized to be 0.203" in length, the tolerance specified would be +0.0000", −0.0005", while the corresponding sizing of the length of concentric bore 29 would likewise be stated to be 0.203", but with a specified tolerance of +0.0005", −0.0000". Thus, when concentric aligner 43 is fitted into concentric bore 29, they will be concentric with each other to a very close tolerance, and when buttress flange 45 comes into contact with flange face 25, step flange 47 will simultaneously come into contact with step shoulder 37. As will be well understood by those skilled in the art, it is also important that, to make such contacts across the full planar surfaces of buttress flange 45 against flange face 25, and step flange 47 against step shoulder 37, the planar faces must all be parallel to each other, at least across the contacting surface, with the surface finishes preferably formed by grinding to 10-20 RMS.

Likewise, the dimensional tolerance of pilot 41 and pilot bore 31, relative to each other, are quite important. The diametrical sizing of pilot 41 must match that of pilot bore 31 to a very close tolerance, with the difference preferably being no greater than 0.001". For Example, if pilot 41 is to be diametrically sized at 0.967", the tolerances specified would be +0.0000", −0.0005", while the corresponding diametrical sizing of pilot bore 31 would likewise be stated as 0.967", but the specified tolerances would be +0.0005", −0.0000". The length of pilot 41 preferably should also be at least as great as that of pilot bore 37 to enable pilot end 49 to come into contact with pilot face 39. Pilot end 49 is formed in a plane perpendicular to rotational axis 27 and parallel to buttress flange 45 and step flange 47. To ensure full contact of the planar surface of pilot end 49 with pilot face 39, it is preferred that pilot face 39, likewise, be formed in a plane perpendicular to rotational axis 27 and parallel to flange face 25 and step shoulder 37, i.e., the squared off end of a blind bore.

There is yet another dimensions that is critical to the functioning of the preferred embodiment of the present invention, where full contact between pilot face 39 and pilot end 49 are to be made. The linear dimension between flange face 25 and pilot face 39, of female coupler 13, must match to a close tolerance, preferably to a difference of no greater than 0.001", the linear dimension between buttress flange 45 and pilot end 49 of male coupler 11. For example, if the linear dimension between flange face 25 and pilot face 39 is to be 1.000", the specified tolerance would be +0.0005", −0.0000"; in turn, the corresponding linear dimension between buttress flange 45 and pilot end 49 would likewise be specified to be 1.000", but with a tolerance of +0.0000", −0.0005". Thus, contact of pilot end 49 with pilot face 39 would be essentially simultaneous with the contact of flange face 25 and buttress flange 45 and the contact of step shoulder 37 with step flange 47, respectively.

Figure 7:
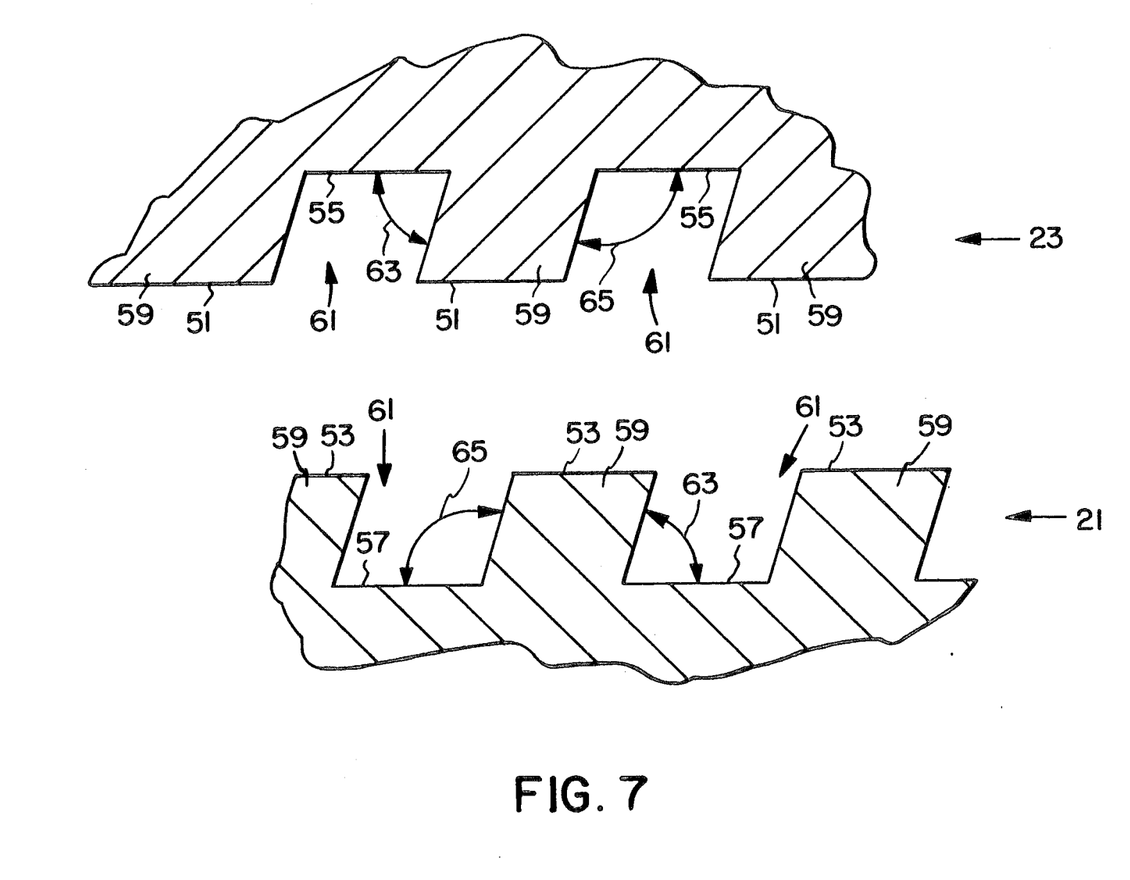
FIG. 7 is a semi-schematic, cut-away side elevational view, enlarged, showing the detail of the correspondence of the threads of the female coupler and the male coupler, respectively, of the preferred embodiment of the present invention.

Referring to FIG. 7, the relationship of the preferred embodiments of male thread 21 to female thread 23 is diagramed. Both threads 21 and 23 are, in their cross sections as shown in FIG. 7, formed to be fully complementary to each other, to correspond with and interfit with each other in a manner that will be well understood by those skilled in the art. The shape and form of the cross sections of threads 21 and 23, as shown in FIG. 7, is what will be referred to hereinafter as a modified square thread, distinguishing them from a true square thread, an Acme thread, a Whitworth thread, an American Standard thread (coarse or fine), or any other well known thread design. The modified square thread embodies the following distinguishing features. Preferably, the modified square thread is a single lead, although it may have two or more leads. With respect to the crest and root diameters of threads 21 and 23, in keeping with the modified square thread design, the internal diametrical dimension spanning the crests of female thread 23, which is the diametrical dimension of step bore 24, is preferably about 0.010" greater than the external diametrical dimension spanning the roots 57 of male thread 21. On the other hand, the internal diametrical dimension spanning the roots 55 of female thread 23 is preferably only about 0.005" greater than the external diametrical dimension spanning the crests of male thread 21. For example, female thread 23 may have a crest 51 span diameter of 0.980" while the root 57 span diameter of corresponding male thread 21 might be 0.970"; on the other hand, female thread 23 might have a root 55 span diameter of 1.130" while the crest 53 span diameter of corresponding male thread 21 might be 1.125". Of course, as will be well understood by those skilled in the art, when male coupler 11 is threaded into female coupler 13, the crests 53 of male thread 21 are positioned adjacent to the roots 55 of female thread 23, and, correspondingly, the crests 51 of female thread 23 are positioned adjacent to the roots 57 of male thread 21, Thus, the clearances, crests to corresponding roots, are about half of the differences in corresponding diametrical dimensional span tolerances, i.e., the clearance between crest 21, of female thread 23, and root 57, of male thread 21, is preferably about 0.005" while the clearance between crest 23, of male thread 21, and root 55, of female thread 23, is about 0.0025", in the preferred embodiment, when tool segments 17 and 19 are assembled together.

In the preferred embodiment of the present invention, incorporating the modified square thread design, the threads 59 of both the female thread 23 and the male thread 21 are separated by thread grooves 61. The width of thread grooves 61 is preferably about 0.005" greater than the width of the threads 59. Thus, in the foregoing modified square thread examples, the width of the thread grooves 61, measured parallel to the rotational axis 27, may be about 0.100" while the width of the interpositioned threads 59, also measured parallel to the rotational axis 27, would be about 0.095".

Again referring to FIG. 7, what makes the preferred modified square thread design conceptually different, from a conventional square thread design, is that the threads 59 are canted, from rotational axis 27 outwardly, in the direction of the cutting tip end of the tool, which in FIG. 7 is toward the right hand side. In particular, from the rotational axis 27, the minor thread angle 63 is within a range of 70° to 80° while the major thread angle 65 is within a range of 100° to 110°; preferably the minor thread angle 63 is 75° and the major thread angle 56 is 105°. The thread 59 cant angle, as defined by the minor thread angle 63 and the major thread angle 65, is significant, as it has been found that, within the defined cant angle range, the tool segments 17 and 19 can readily be disassembled by hand to make changes, and the tightenability of the tool segments 17 and 19 seems to be enhanced in that the full contacts between the planar surfaces, upon assembly of tool segments 17 and 19 as described above, is more facilely achieved by hand. Also, the tool segments seemingly are less readily loosened from each other by reversing the direction of rotation of the spindle of the machine tool with which the tooling is in use. These enhancements are predominantly enabled by the use of the preferred modified square thread design incorporating a thread cant angle within the specified range.

The applicable principles which provide the enhancement of the foregoing features, by incorporation of the specified thread cant angle range, are not fully understood, but it is known that such enhancement seemingly significantly diminishes when the thread cant angle is formed beyond the range defined above, more so if a lesser cant angle is used, i.e., if the minor thread angle 63 is greater than 80° and the major thread angle 65 is less than 100°. It has also been recognized that the foregoing enhancements seemingly tend to be diminished if the clearances between the thread crests 51 and 53 and the thread roots 57 and 55, respectively, are altered significantly from those preferred, and/or if the preferred tolerances, providing clearances between the threads 59 and the thread grooves 61, are altered significantly.

As will be noted by viewing FIG. 2 and FIG. 4, there is preferably a coolant passage 67 extending through the length of each of tool segments 17 and 19, preferably aligned generally to parallel rotational axis 27. When tool segments 17 and 19 are assembled together as described above, the coolant passages 67 are aligned with each other to permit coolant flow therethrough to the cutting tip end of the tool. As with tool segment 19, tool segment 17 also includes a chip groove 25 which preferably extends the length of tool segment 17. When tool segments 17 and 19 are assembled together as described above, chip grooves 35 are aligned with each other to provide egress for the cutting chips as they are formed by the cutting tip of the tool.

As described so far herein, it may have been implied that the tool may be comprised of but only two tool segments 17 and 19 assembled together as described above. To the contrary, the tool may also be comprised of more than two tool segments 17 and 19, for example, with a second male coupler 11 being superimposed to extend from that end of tool segment 19 which is opposite from female coupler 13. In similar fashion, a second female coupler 13 could be superimposed to extend from the end of tool segment 17 which is opposite from male coupler 11, as is indicated in FIG. 1 by the outline of a second pilot bore 31 in the right hand end of tool segment 17. With the foregoing superimpositions, the multiple tool segments comprising the tool could be identical, enabling the tool to be extended to any practical length by the addition of more tool segments. Of course, in any tool using the tool segments of the present invention, as will be readily recognized by those skilled in the art, there must always be an end which provides a mount for the cutting tip, and there must always be an end, opposite the cutting tip, which provides a tool holder mount for the tool into the machinery, e.g., a gun drilling machine, which is to operate that tool. Thus, at least two of such superimposed tool segments of the present invention might be adapted, one to have any one of a variety of more or less standard and well known cutting tip mounting means in place of that tool segment's male coupler 11, and one to have any one of a variety of different well known standard tool holder mounts in place of that tool segment's female coupler 13.

The assembly of tool segments 17 and 19, as described above, provides means by which the axial misalignment thereof is prevented. The close tolerance fits of concentric aligner 43 to concentric bore 29 and of pilot 41 to pilot bore 31, respectively, acting in concert at either ends of male and female threads 21 and 22, essentially prevents bend moment caused misalignment of the assembled tool segments 17 and 19 from axial symmetry about rotational axis 27. Further, any small degree of misalignment which might occur due to the clearances, albeit very small, are further inhibited by the planar contacts between buttress flange 45 and flange face 25, between step flange 47 and step shoulder 37 and preferably also between pilot end 49 and pilot face 37. These planar contacts serve to stiffen the assembled tool segments 17 and 19 by virtue of solid metal-to-metal contact across a significant surface area. For misalignment to occur, the planar surface contacts would have to be disrupted and the surfaces separated, which is prevented by virtue of the engagement of male thread 21 and female thread 23. Flex of the tool which produces torsional twisting, during rotation of and cutting by the tool, serves to further lock together the preferred modified square thread arrangement of male thread 21 and corresponding female thread 23, thus applying additional pressure to the planar contacts just described, tending to further stiffen the tool into a rigid, axially aligned unit and further reducing any remaining propensity for axial misalignment between the assembled tool segments 17 and 19 which might be caused by a shock force applied to the cutting tip of the tool (such as, for example, which might be encountered when the cutting tip breaks or chips).

While the present invention has been described with reference to the preferred embodiment and the presently known best mode, there are modification which may be made without departing from the spirit of the invention. The scope of the invention is not to be understood as limited by the specific illustrations or by the detailed description of the preferred embodiment and presently known best mode, as described hereinabove, but rather is defined by the claims set forth hereinafter.

What is claimed is:

1. An interchangeable cutting tool alignment and positioning system comprising, at least, a first tool segment and a second tool segment, said first tool segment comprising a male coupler means axially aligned with and concentric with an axis of rotation of said first tool segment, said second tool segment comprising a female coupler means aligned with and concentric with an axis of rotation of said second tool segment, said male coupler means which extends from an end of said first tool segment, said male coupler means which comprises:

a.) pilot means, extending from one end of said male coupler means as an integral part of said male coupler means, said pilot means which provides a first cylindrical mating surface for assembly of said first and second tool segments in coaxial alignment with each other relative to their respective axes of rotation;

b.) concentric alignment means, separated from and spaced apart from said pilot means, said concentric alignment means which are integral parts of said male coupler means, said concentric alignment means which provides a second cylindrical mating surface for assembly of said first and second tool segments in coaxial alignment with each other relative to their respective axes of rotation;

c.) first planar surface means which provide a first planar mating surface for assembly of said first and second tool segments in coaxial alignment with each other relative to their respective axes of rotation, said first planar mating surface which is perpendicular to said first tool segment axis of rotation and said second cylindrical mating surface of said concentric alignment means, said first planar mating surface which extends inwardly, from said concentric alignment means, toward said first tool segment axis of rotation;

d.) second planar surface means which provide a second planar mating surface for assembly of said first and second tool segments in coaxial alignment with each other relative to their respective axes of rotation, said second planar mating surface extending outwardly from said concentric alignment means, away from said first tool segment axis of rotation, at the opposite end of said concentric alignment means from said first planar surface means, said second planar mating surface which is perpendicular to said first tool segment axis of rotation and said second cylindrical mating surface of said concentric alignment means;

e.) male thread means, extending between and spacing apart said pilot means and said concentric alignment means, said male thread means which are concentric with said pilot means and said concentric alignment means, said male thread means which serve to provide threadable engagement between, and the holding together of, said assembly of said first and second tool segments in coaxial alignment with each other relative to their respective axes of rotation; and said female coupler means which are integral with and formed into one end of said second tool segment, said female coupler means which comprise:

f.) pilot bore means, extending within said one end of said female coupler means, said pilot bore means which provide a first complementary cylindrical mating surface, corresponding to said first cylindrical mating surface of said pilot means, for assembly of said first and second tool segments in coaxial alignment with each other relative to their respective axes of rotation;

g.) concentric bore means, separated and spaced apart from said pilot means, said concentric bore means which are integral with said female coupler means, said concentric bore means which provide a second complementary cylindrical mating surface corresponding to said second cylindrical mating surface of said concentric alignment means, for assembly of said first and second tool segments coaxially aligned with each other relative to their respective axes of rotation;

h.) first complementary planar surface means which provide a first complementary planar mating surface, corresponding to said first planar mating surface of said concentric alignment means, for assembly of said first and second tool segments in coaxial alignment with each other relative to their respective axes of rotation, said first complementary planar mating surface which is perpendicular to said second tool segment axis of rotation and said second complementary cylindrical mating surface of said concentric bore means, said first complementary planar mating surface means which extends inwardly from said concentric bore means toward said second tool segment axis of rotation;

i.) second complementary planar surface means which provide a second complementary planar mating surface, corresponding to said second planar mating surface of said second planar mating surface means, for assembly of said first and second tool segments in coaxial alignment with each other relative to their respective axes of rotation, said second complementary planar mating surface which extends outwardly from said concentric bore means away from said second tool segment axis of rotation, said second complementary planar mating surface which extends at the opposite end of said concentric bore means from said first complementary planar surface means, said second complementary planar mating surface which is perpendicular to said second tool segment axis of rotation;

j.) female thread means extending between said pilot bore means and said concentric bore means, separating and spacing apart said pilot bore means and said concentric bore means, said female thread means which are concentric with said pilot bore means and said concentric bore means, said female thread means which are complementary with and correspond to said male thread means, said female thread means which, in conjunction with said male thread means, provide threadable engagement between and the holding together of said first and second tool segments, for assembly of said first and second tool segments in coaxial alignment with each other relative to their respective axes of rotation;

said male coupler means and said female coupler means which provide for threadable coaxial engagement of said first and second tool segments relative to their respective axes of rotation to concentrically align said first and second tool segments such that a single common rotational axis is provided, said male coupler means and said female coupler means which, on assembly of said first and second tool segments, also prevent misalignment of said first and second tool segment from said single common rotational axis.

2. The invention of claim 1 further comprising:

a.) third planar surface means which provide an additional planar mating surface for assembly of said first and second tool segments in coaxial alignment with each other relative to their respective axes of rotation, said third planar mating surface being located at said one end of said male coupler means and forming a terminus of said one end of said male coupler means, said third planar mating surface which is perpendicular to said first tool segment axis of rotation and to said first cylindrical mating surface of said pilot means, said third planar mating surface which extends from said first cylindrical mating surface of said pilot means to said first tool segment axis of rotation; and b.) third complementary planar surface means which provides an additional complementary planar mating surface, corresponding to said additional planar mating surface of said third planar mating surface means, for assembly of said first and second tool segments in axial alignment with each other relative to their respective axes of rotation, said third complementary planar mating surface being located at said one end of and integral with said female coupler means, forming a terminus of said one end of said female coupler means, said third complementary planar mating surface which is perpendicular to said second tool segment axis of rotation and said first complementary cylindrical mating surface of said pilot bore means, said third complementary planar mating surface which extends from said complementary cylindrical mating surface of said pilot bore means inwardly to said second tool segment axis of rotation.

3. The invention of claim 1 wherein said male thread means comprises a modified square male thread and said female thread means comprises a complementary and corresponding modified square thread.

4. The invention of claim 2 wherein said male thread means comprises a modified square male thread and said female thread means comprises a complementary and corresponding modified square thread.

5. The invention of claim 1 wherein said first tool segment also comprises female coupler means positioned at the end of said first tool segment opposite from said male coupler means, and said second tool segment also comprises male coupler means positioned at the end of said second tool segment opposite from said female coupler means.

6. The invention of claim 2 wherein said first tool segment also comprises female coupler means positioned at the end of said first tool segment opposite from said male coupler means, and said second tool segment also comprises male coupler means positioned at the end of said second tool segment opposite from said female coupler means.

7. The invention of claim 3 wherein said first tool segment also comprises female coupler means positioned at the end of said first tool segment opposite from said male coupler means, and said second tool segment also comprises male coupler means positioned at the end of said second tool segment opposite from said female coupler means.

8. The invention of claim 4 wherein said first tool segment also comprises female coupler means positioned at the end of said first tool segment opposite from said male coupler means, and said second tool segment also comprises male coupler means positioned at the end of said second tool segment opposite from said female coupler means.

9. The invention of claim 1 wherein the difference in diametrical size of said first cylindrical mating surface of said pilot means and said first complementary cylindrical mating surface of said pilot bore means is no greater than 0.001", and the difference in diamterical size of said second mating surface of said concentric alignment means and said second complementary cylindrical mating surface of said concentric bore means is no greater than 0.001", and the linear distance between said first planar mating surface of said first planar surface means and said second planar mating surface of said second planar surface means is no less than 0.001" less than, and no greater than, the linear distance between said first complementary planar mating surface of said first complementary planar surface means and said second complementary planar mating surface and said second planar surface means.

10. The invention of claim 2 wherein the difference in diametrical size of said first cylindrical mating surface of said pilot means and said first complementary cylindrical mating surface of said pilot bore means is no greater than 0.001", and the difference in diamterical size of said second mating surface of said concentric alignment means and said second complementary cylindrical mating surface of said concentric bore means is no greater than 0.001", and the linear distance between said first planar mating surface of said first planar surface means and said second planar mating surface of said second planar surface means is no less than 0.001" less than, and no greater than, the linear distance between said first complementary planar mating surface of said first complementary planar surface means and said second complementary planar mating surface and said second planar surface means.

11. The invention of claim 3 wherein the difference in diametrical size of said first cylindrical mating surface of said pilot means and said first complementary cylindrical mating surface of said pilot bore means is no greater than 0.001", and the difference in diamterical size of said second mating surface of said concentric alignment means and said second complementary cylindrical mating surface of said concentric bore means is no greater than 0.001", and the linear distance between said first planar mating surface of said first planar surface means and said second planar mating surface of said second planar surface means is no less than 0.001" less than, and no greater than, the linear distance between said first complementary planar mating surface of said first complementary planar surface means and said second complementary planar mating surface and said second planar surface means.

12. The invention of claim 4 wherein the difference in diametrical size of said first cylindrical mating surface of said pilot means and said first complementary cylindrical mating surface of said pilot bore means is no greater than 0.001", and the difference in diamterical size of said second mating surface of said concentric alignment means and said second complementary cylindrical mating surface of said concentric bore means is no greater than 0.001", and the linear distance between said first planar mating surface of said first planar surface means and said second planar mating surface of said second planar surface means is no less than 0.001" less than, and no greater than, the linear distance between said first complementary planar mating surface of said first complementary planar surface means and said second complementary planar mating surface and said second planar surface means.

13. The invention of claim 5 wherein the difference in diametrical size of said first cylindrical mating surface of said pilot means and said first complementary cylindrical mating surface of said pilot bore means is no greater than 0.001", and the difference in diamterical size of said second mating surface of said concentric alignment means and said second complementary cylindrical mating surface of said concentric bore means is no greater than 0.001", and the linear distance between said first planar mating surface of said first planar surface means and said second planar mating surface of said second planar surface means is no less than 0.001" less than, and no greater than, the linear distance between said first complementary planar mating surface of said first complementary planar surface means and said second complementary planar mating surface and said second planar surface means.

14. The invention of claim 6 wherein the difference in diametrical size of said first cylindrical mating surface of said pilot means and said first complementary cylindrical mating surface of said pilot bore means is no greater than 0.001", and the difference in diamterical size of said second mating surface of said concentric alignment means and said second complementary cylindrical mating surface of said concentric bore means is no greater than 0.001", and the linear distance between said first planar mating surface of said first planar surface means and said second planar mating surface of said second planar surface means is no less than 0.001" less than, and no greater than, the linear distance between said first complementary planar mating surface of said first complementary planar surface means and said second complementary planar mating surface and said second planar surface means.

15. The invention of claim 7 wherein the difference in diametrical size of said first cylindrical mating surface of said pilot means and said first complementary cylindrical mating surface of said pilot bore means is no greater than 0.001", and the difference in diamterical size of said second mating surface of said concentric alignment means and said second complementary cylindrical mating surface of said concentric bore means is no greater than 0.001", and the linear distance between said first planar mating surface of said first planar surface means and said second planar mating surface of said second planar surface means is no less than 0.001" less than, and no greater than, the linear distance between said first complementary planar mating surface of said first complementary planar surface means and said second complementary planar mating surface and said second planar surface means.

16. The invention of claim 8 wherein the difference in diametrical size of said first cylindrical mating surface of said pilot means and said first complementary cylindrical mating surface of said pilot bore means is no greater than 0.001", and the difference in diamterical size of said second mating surface of said concentric alignment means and said second complementary cylindrical mating surface of said concentric bore means is no greater than 0.001", and the linear distance between said first planar mating surface of said first planar surface means and said second planar mating surface of said second planar surface means is no less than 0.001" less than, and no greater than, the linear distance between said first complementary planar mating surface of said first complementary planar surface means and said second complementary planar mating surface and said second planar surface means.

17. The invention of claim 3 wherein the linear distance between said second planar mating surface of said second planar surface means and said additional planar mating surface of said third planar surface means is no less than 0.001" less than, and no greater than, the linear distance between said second complementary planar mating surface of said second complementary planar surface means and said additional complementary planar mating surface of said third complementary planar surface means.

18. The invention of claim 4 wherein the linear distance between said second planar mating surface of said second planar surface means and said additional planar mating surface of said third planar surface means is no less than 0.001" less than, and no greater than, the linear distance between said second complementary planar mating surface of said second complementary planar surface means and said additional complementary planar mating surface of said third complementary planar surface means.

19. The invention of claim 7 wherein the linear distance between said second planar mating surface of said second planar surface means and said additional planar mating surface of said third planar surface means is no less than 0.001" less than, and no greater than, the linear distance between said second complementary planar mating surface of said second complementary planar surface means and said additional complementary planar mating surface of said third complementary planar surface means.

20. The invention of claim 8 wherein the linear distance between said second planar mating surface of said second planar surface means and said additional planar mating surface of said third planar surface means is no less than 0.001" less than, and no greater than, the linear distance between said second complementary planar mating surface of said second complementary planar surface means and said additional complementary planar mating surface of said third complementary planar surface means.

21. The invention of claim 11 wherein the linear distance between said second planar mating surface of said second planar surface means and said additional planar mating surface of said third planar surface means is no less than 0.001" less than, and no greater than, the linear distance between said second complementary planar mating surface of said second complementary planar surface means and said additional complementary planar mating surface of said third complementary planar surface means.

22. The invention of claim 12 wherein the linear distance between said second planar mating surface of said second planar surface means and said additional planar mating surface of said third planar surface means is no less than 0.001" less than, and no greater than, the linear distance between said second complementary planar mating surface of said second complementary planar surface means and said additional complementary planar mating surface of said third complementary planar surface means.

23. The invention of claim 15 wherein the linear distance between said second planar mating surface of said second planar surface means and said additional planar mating surface of said third planar surface means is no less than 0.001" less than, and no greater than, the linear distance between said second complementary planar mating surface of said second complementary planar surface means and said additional complementary planar mating surface of said third complementary planar surface means.

24. The invention of claim 16 wherein the linear distance between said second planar mating surface of said second planar surface means and said additional planar mating surface of said third planar surface means is no less than 0.001" less than, and no greater than, the linear distance between said second complementary planar mating surface of said second complementary planar surface means and said additional complementary planar mating surface of said third complementary planar surface means.

* * * * *